United States Patent [19]

Gundy

[11] Patent Number: 4,993,722
[45] Date of Patent: Feb. 19, 1991

[54] APPARATUS AND METHOD FOR IMPROVED PIPE TO MANHOLE SEALING

[75] Inventor: William P. Gundy, Milford, N.H.
[73] Assignee: NPC, Inc., Milford, N.H.
[21] Appl. No.: 410,585
[22] Filed: Sep. 21, 1989

Related U.S. Application Data

[63] Continuation-in-part of Ser. No. 281,096, Dec. 7, 1988.
[51] Int. Cl.[5] .................................................. F16J 15/46
[52] U.S. Cl. ............................ 277/34.3; 277/207 A; 277/226
[58] Field of Search ............... 277/34, 34.3, 34.6, 277/207 A, 209, 226, 227, 185; 285/97, 109; 49/477

[56] References Cited

U.S. PATENT DOCUMENTS

| | | | |
|---|---|---|---|
| 1,988,397 | 1/1935 | Reed | 277/34.6 |
| 3,038,732 | 6/1962 | Scott et al. | 277/34 |
| 3,144,153 | 8/1964 | Fuller et al. | 277/227 |
| 3,149,848 | 9/1964 | Galloway | 277/165 |
| 3,190,679 | 6/1965 | Lester | 285/97 |
| 3,258,271 | 6/1966 | Hollingsworth | 277/34.3 |
| 3,262,707 | 7/1966 | Williams | 277/34.3 |
| 3,339,931 | 9/1967 | Hundt et al. | 277/34.3 |
| 3,385,604 | 5/1968 | Tranfler | 277/34.3 |
| 3,695,637 | 10/1972 | Satterthwaite et al. | 285/97 |
| 3,837,700 | 9/1974 | Van Slyke | 49/477 |
| 4,137,970 | 7/1979 | Laflin et al. | 166/292 |
| 4,227,702 | 10/1980 | Thate | 277/34.3 |
| 4,269,419 | 5/1981 | Brant | 277/34.3 |
| 4,300,775 | 11/1981 | Ringel | 277/34.3 |
| 4,508,355 | 4/1985 | Ditcher | 277/34.3 |
| 4,521,452 | 6/1985 | Highsmith | 166/295 |
| 4,568,708 | 2/1986 | Mason et al. | 166/293 |
| 4,624,465 | 11/1986 | Rogemont | 277/34 |

FOREIGN PATENT DOCUMENTS

| | | | |
|---|---|---|---|
| 6982 | 1/1879 | Fed. Rep. of Germany | 277/34.3 |
| 0167567 | 10/1982 | Japan | 277/34.3 |
| 0649140 | 4/1985 | Switzerland | 277/34.3 |

Primary Examiner—Allan N. Shoap
Assistant Examiner—Daniel G. DePumpo
Attorney, Agent, or Firm—Pearson & Pearson

[57] ABSTRACT

An apparatus for sealably and flexibly joining together a pipe member and an enclosed body in a sewer system having a seal comprising an elastic sleeve with an annular cavity. The cavity contains a coagulant material that forms a cellular, viscous gel when activated with water. When the seal is properly positioned, water is pumped under pressure through a valve into the cavity to expand the elastic sleeve into sealing engagement with the pipe and the manhole. In time the water and coagulant material forms the gel that remains in the viscous state.

27 Claims, 4 Drawing Sheets

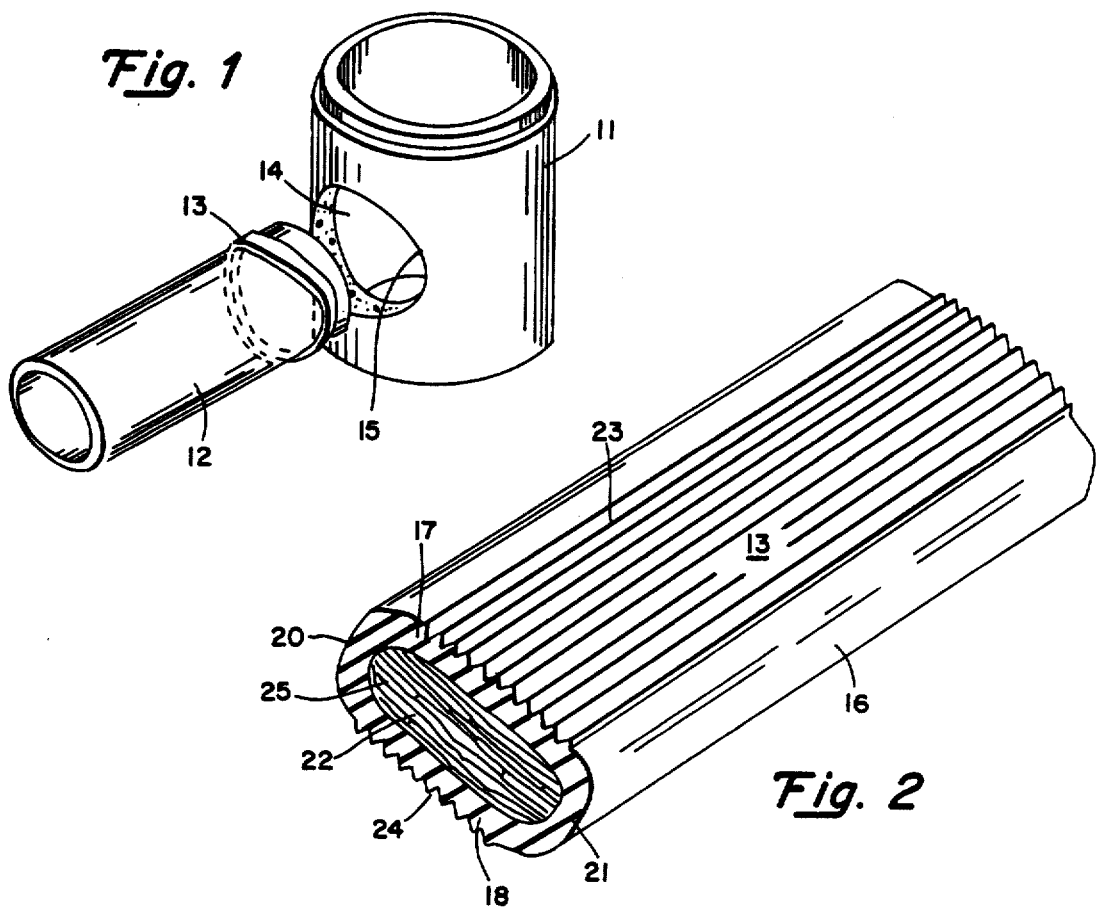
Fig. 1
Fig. 2
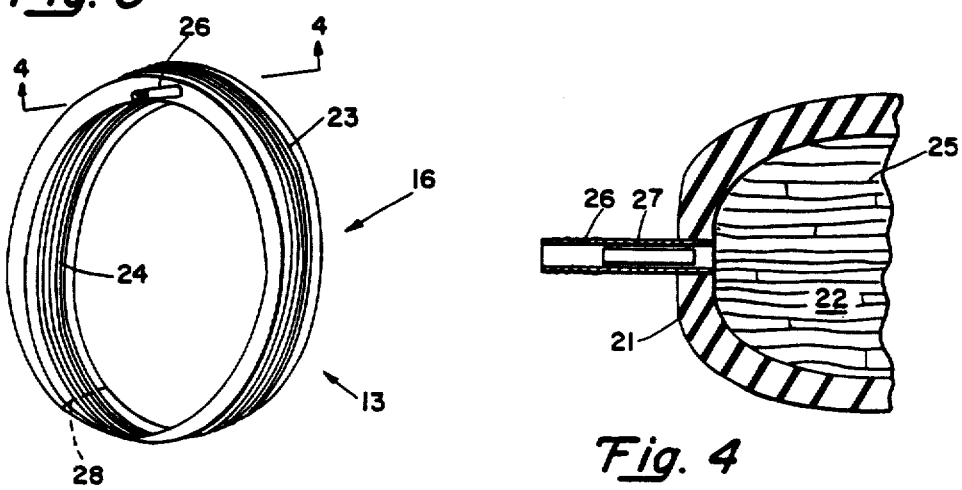
Fig. 3
Fig. 4

APPARATUS AND METHOD FOR IMPROVED PIPE TO MANHOLE SEALING

CROSS REFERENCE TO RELATED APPLICATION

This application is a continuation-in-part of United States patent application Ser. No. 07/281,096 filed Dec. 7, 1988 for Apparatus and Method for Improved Pipe to Manhole Sealing, which application is assigned to the same assignee as the present invention.

FIELD OF THE INVENTION

This invention generally relates to sealing arrangements for pipe joints and more specifically to an improved seal for joining a sewer pipe to a manhole.

BACKGROUND OF THE INVENTION

Various approaches for connecting pipes to manholes in sewer systems are known. U.S. Pat. No. 3,958,313 Assigned to NPC, Inc. discusses considerations and complications that are associated with the installation of such sewer systems, particularly with respect to the alignment and sealing of pipes and manholes. This patent proposes a seal in the form of a boot. A first end fits over a pipe; a second end, within a porthole formed in the manhole riser; and a transition section extends between the two ends. During installation hydraulic or other jacking means move links on an expandable ring, placed inside the second end of the seal. The links expand the ring with considerable force and seal the second end of the boot to the riser at the porthole. With the pipe inserted through the first end of the boot, an external clamp seals the second end to the pipe and completes the connection. While this approach is generally effective, complexity in seal manufacture and the requirement for separate clamping members increases the overall costs of the seal and of its installation on site.

Another class of pipe-to-riser seals comprises hollow sealing structures in which filler materials expand the riser. In U.S. Pat. No. 2,815,966 installation requires the steps of filling an annular sleeve with polybutene and then squeezing the sleeve to evacuate the sleeve of air and the polybutene. A film of polybutene remains to keep the internal surfaces of the sleeve together. The collapsed sleeve rests on the spigot end of a pipe which is positioned within the bell portion of an adjacent pipe. A self-hardening cementitious grout, forced into the sleeve, breaks the internal seal formed by the polybutene and expands the sleeve into the space between the spigot and the bell whereupon the grout hardens and maintains the seal. U.S. Pat. No(s). 3,222,076 and 3,258,271 disclose similar seals in which the filler material comprises a liquid that hardens. In accordance with U.S. Pat. No. 3,473,829, a liquid that solidifies in time fills the seal for permanent installations; a gas filler material is used for temporary installations.

U.S. Pat. No. 4,269,419 discloses a double-walled sleeve with ribbed surfaces that contact the pipe and the manhole. After the seal is positioned, an elastomer or other fluid, that is not intended to set up completely, is forced into the sleeve through an input valve under pressure. When the material emerges from a vent valve, the vent valve is closed with a pressure gauge. Additional pumping occurs until a predetermined pressure is achieved at the vent valve whereupon the valves are closed. The material then assumes its final form over time.

Each of the foregoing systems requires special materials or equipment. U.S. Pat. No. 2,815,966 requires the use of polybutene and rollers for a special evacuation step. U.S. Pat. No(s). 3,222,076 and 3,258,271 and 4,269,419 require separate filling and vent valves. U.S. Pat. No. 3,473,829 requires separately extruded or formed components that are connected together to form a seal. These extra or specially formed components add to the cost of the seal itself and to the complexity and cost of on-site installation.

From time-to-time, it has been found that insufficient filler has been forced into the seal, and the seal leaks. In the foregoing proposals, however, the filler materials have either hardened or formed a resilient solid mass before this problem is evident. This makes it difficult to reestablish the seal by introducing more filler, as the hardened or set mass blocks the effective transfer of additional material throughout the sleeve. Thus, in such situations it has been necessary to remove the sleeve from the pipe, often with considerable difficulty and often with excavation around the manhole.

SUMMARY OF THE INVENTION

Therefore, it is an object of this invention to provide a seal between a pipe and a supporting structure that is simple to construct and install.

Another object of this invention is to provide a seal between a pipe and a supporting structure that facilitates modifications to the seal after installation.

Still another object of this invention is provide a seal that is pressurized on site, but that requires no special materials during installation.

In accordance with one aspect of this invention, a seal comprises a double-walled, elastic sleeve formed with one or more continuous cavities. A coagulant material is disposed in the cavity during construction of the seal, normally at the factory. At the site, the seal is inserted onto the end of a pipe and positioned to register with the surface of a porthole through a manhole riser. When the pipe is properly positioned, personnel pump a non-viscous liquid, such as water, into the cavity through a valve to expand the sleeve into sealing contact with the manhole riser and the pipe. Over time the water and the coagulant material coact in situ to form a cellular, viscous mass that completely fills the cavity in the seal. As the mass is cellular, it is possible to introduce more liquid into the sleeve at a later time to further increase the size of the seal; this liquid will further be assimilated in the mass.

This invention is pointed out with particularity in the appended claims. It may be better understood, however, by referring to the following detailed description taken in conjunction with the accompanying drawings.

BRIEF DESCRIPTION OF THE DRAWINGS

FIG. 1 is a view of a typical installation of a pipe and manhole using a seal constructed in accordance with this invention;

FIG. 2 is a view of an extrusion that forms a seal shown in FIG. 1;

FIG. 3 is a view of a typical seal formed for an installation as shown in FIG. 1 and that uses the material shown in FIG. 2;

FIG. 4 is a cross-section along lines 4—4 in FIG. 3;

DETAILED DESCRIPTION OF THE PREFERRED EMBODIMENT

Figure 5:
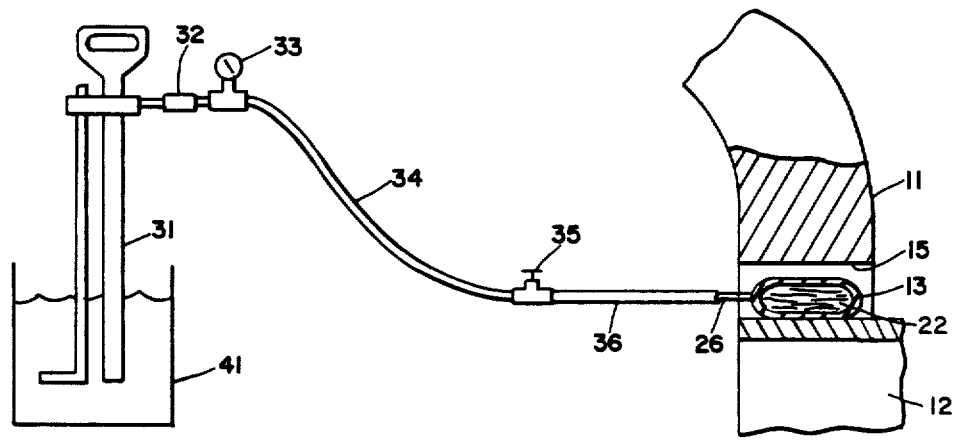
FIG. 5 is a pictorial view of equipment required for installing the seal on site.

This invention has application primarily in sewer systems of the type represented by FIG. 1. More specifically, a supporting structure in the form of an enclosure body such as a manhole riser 11 receives a pipe member 12 through a porthole 14 formed through the riser 11 and defining a circular edge or cylindrical surface 15, although this invention is not limited to applications involving cylindrical pipes. Normally the porthole 14 is core drilled and the surfaces 15 are relatively smooth. However, cast or formed holes with smooth surfaces, if necessary, are equally effective. Typically the manhole riser 11 has two or more portholes to receive a two or more pipes 12; only a single pipe and porthole are shown in FIG. 1 for discussion purposes.

FIG. 1 depicts the relationship of the pipe, seal and riser during one stage of installation. Specifically, the seal 13, in a collapsed, or pre-expanded, state, has been positioned on the pipe member 12. Rather than being merely in a transverse plane through the pipe 12, the seal is arranged to be in register with the curved surface 15 such that it is relatively centrally positioned in the porthole 14. Once the seal 13 is positioned, the pipe 12 and seal 13 are moved as a unit into the porthole 14.

Referring to FIG. 2, the seal 13, in one embodiment, comprises a section 16 from an indeterminate length of an extruded, double walled sleeve. The sleeve section 16 has a generally oval cross section with elongated sides 17 and 18 and end walls 21 that define a cavity 22. The sides 17 and 18 are extruded with grooves 23 and 24 respectively. In this particular embodiment, the grooves 23 and 24 have triangular cross sections and facilitate the sealing to the pipe 12 and to the surface 15 in FIG. 1.

The seal 13, with its closed structure, is formed by cutting the section 16 of the extruded sleeve to a length that is slightly less than the peripheral distance, normally the circumference, of the pipe 12 (FIG. 1). Then a coagulant material that may comprise sheets 25 of film or a granular material are disposed in the cavity 22.

More specifically, the coagulant material can comprise any of several water-activated coagulant materials that combine with a liquid, such as water, to form a cellular, viscous gel that does not harden with time. Specifically, the resulting filler for the cavity 22 is an amorphous, cellular gelatinous mass. Further, the coagulant material and the resulting gel must be environmentally safe and stable over long time periods. Several water-activated coagulant materials in crystalline or granular form are available. One such material is a polyacrylamide in granular form that is available from a number of sources. Granular coagulant materials are merely poured into the cavity to provide a fill of about 4%.

Another material in sheet form comprises a cellulose gum or sodium carboxymethyl cellulose from Aqualon Company. Typically, the sheets 25 are bundled and then pulled through the cavity 22 (FIG. 2) and trimmed. The fill fraction for the cavity 22 is not critical. The number of sheets 25 should be selected to provide a highly viscous mass at maximum expansion. Equally effective is a series of water soluble pouches containing cellulose gum and a dispersant which are also pulled through the cavity 22 (FIG. 2) and trimmed.

As shown in FIGS. 3 and 4, the seal is completed by installing a conventional valve stem 26 and valve 27 in one end wall 18 by techniques well known in the art. Normally this valve is positioned as shown in FIG. 4. A similarly positioned flush fit valve using a needle filler, could also be used. In addition, the section 16, shown in FIG. 2, is formed into a closed loop with the ends of the section 16 being positioned proximate to each other as shown in FIG. 3. A mold receives the ends and permits rubber to be injected into the space between the ends. The mold heats the ends and the injected rubber to provide a true rubber bond, represented by a dashed line 28 in FIG. 3. The sleeve then is pressurized to test the bond. The foregoing procedure represents the extent of factory construction.

The equipment shown in FIG. 5 is used on site for installation. A hand pump 31 or other pump moves a liquid, such as water, under pressure through a check valve 32, a pressure gauge 33, and a hose 34 of arbitrary length that is lead down the interior of the riser 11 to the proximity of the seal 13. The end of hose 34 is connected to a drain cock 35. A short hose section 36 couples the output from the tank valve to the valve stem 26.

At the site, personnel install the seal onto the pipe 12, as shown in FIG. 1, with the valve stem 26 at the top of the pipe 12 and oriented to face the interior of the riser 11 as shown in FIG. 5. Once the pipe 12 is positioned, the hose section 38 is connected to the valve stem 26 or valve 27. The pump 31 is disposed in a liquid reservoir, such as a pail 41 or other container. The pail 41 contains a low-viscosity, substantially incompressible liquid, such as water. However, in cold weather applications, an antifreeze solution, such a automotive windshield washer antifreeze, can be added to prevent freezing until the manhole and pipe are properly covered.

Personnel then operate the pump 31 forcing the liquid through the check valve 32 and the valve 27 into the seal 13. With continued pumping, the seal 13 expands into the riser surface 15. Eventually, the pressure, as read on the gauge 33, increases; at some nominal pressure, determined primarily by the structure of the seal 13, pumping is stopped. A typical pressure range is 30 to 50 psi. At this point the drain cock 35 is used to bleed any entrained air from the liquid in the seal 13. After any air is removed, additional pumping brings the pressure back to the 30 to 50 psi range, or other pressure range as may be appropriate. If no significant pressure drop occurs, the system is fully bled, and the hose 30 is removed from the valve stem 26, which is then capped.

Figure 6:
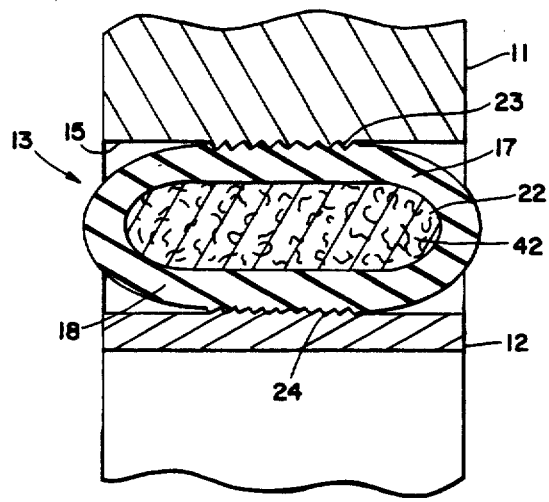
FIG. 6 is a partial cross sectional view of the seal after it is expanded.

From this discussion, it will be apparent that the liquid, under pressure, initially expands the seal 13 into contact with the riser surface 15. Over time, however, the liquid and coagulant material, whether in film, gum or granular form, coact in situ and form a cellular, viscous gel. As shown in FIG. 6, the sealing structure includes the interface between the grooves 23 in the wall 17 and the riser 11 and the interface between the grooves 24 in the wall 18 and the pipe 12. The seal 13 is maintained in its cross section by the gel 42 that has formed in the cavity 22. As the gel 42 is viscous, it provides a reasonable degree of flexibility in relative motion between the pipe 12 and the riser 11 while still maintaining its sealing integrity.

The cellular nature of the gel 42 provides another important advantage. If it should be found that the seal integrity has been broken, typically through shifting of the pipe 12 and riser 11, it is not necessary to remove the seal 13. If such a situation were to arise, even after the gel 42 forms, it is merely necessary to use the equipment in FIG. 5 to force additional liquid into the seal 13 until the seal holds. The liquid will disperse throughout the cavity 22 as it passes through the interstices formed in the gel 42. Moreover, the newly added liquid will again combine with the gel 42 and not remain separated within the cavity. During such a repair, all operations take place through the manhole; no excavation around the manhole should be necessary.

Figure 7:
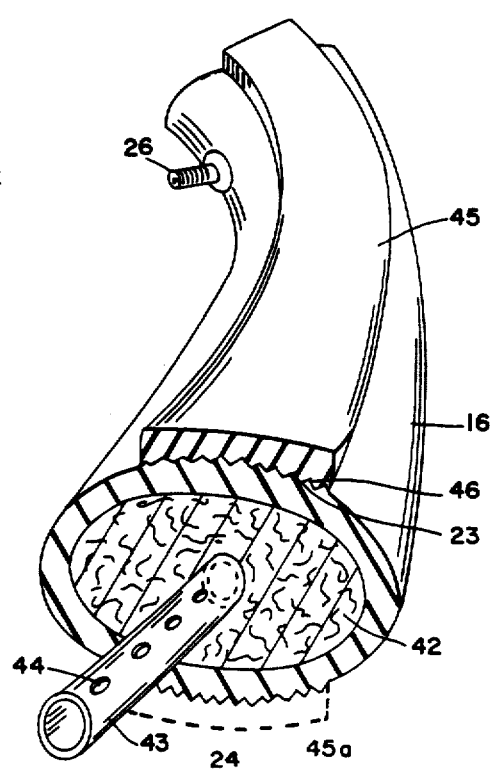
FIG. 7 depicts two modifications that can be made to the seal shown in FIG. 2 through FIG. 4.

FIG. 7 illustrates two modifications that can be made to the seal as disclosed in FIGS. 2 and 5. In the first modification, a tube 43, with spaced perforations 44, is disposed in the cavity 22. This tube 43 connects to the valve stem 26 and ensures a rapid, even distribution of the liquid through the cavity 22. It further improves the distribution of the liquid during repairs of the seal 13.

In another modification, an extruded rib 45 with grooves 46, that complement the grooves 23 or 24, provides a smooth sealing surface. Such a rib 45 is useful in situations where the sealing surface of either the riser or pipe is not particularly smooth. This rib 45 attaches to one of the elongated sides 17 or 18, as required, by adhesion, bonding or other process known in the art. In some applications it may be desirable to apply ribs to both grooves 24 and 25. FIG. 7 depicts the addition of a second rib 45a in phantom. This rib 45a attaches to the section 16 at the grooves 24.

Figure 8:
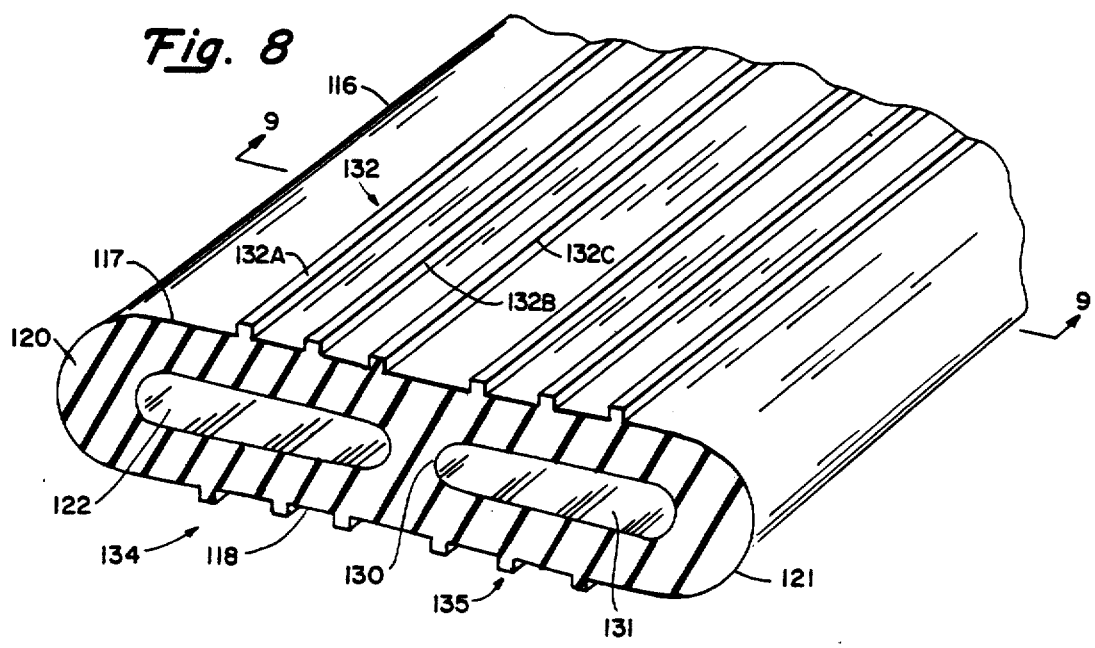
FIG. 8 is a view of another extrusion that forms a seal in accordance with this invention.

FIG. 8 depicts a section 116 from an indeterminate length of an extruded double walled sleeve having an alternative configuration to that shown in FIG. 2. Like the sleeve shown in FIG. 2, the sleeve section 116 has a generally oval cross section with elongated sides 117 and 118 and thicker end walls 120 and 121. The section 116 differs, however, by having an intermediate elongated membrane 130 formed between the elongated sides 117 and 118 thereby to define two cavities 122 and 131 that are positioned in a side-by-side relationship. In addition the grooves 23 and 24 in FIG. 2 are replaced by a series of rectangular or rounded ribs disposed in sets. The ribs in each set are spaced apart by a distance which is greater than the height of the individual ribs so that each rib can flex independently of any adjacent rib. In the particular embodiment shown in FIGS. 8 and 9, a set 132 comprises three rectangular ribs 132A, 132B and 132C on the surface of the elongated side 117 above the cavity 122. A similar set 133 is located above the cavity 131 and sets 134 and 135 are disposed below the cavities 122 and 131 respectively. By way of a specific example, in one embodiment the rib spacing is three to four times the rib width; and the rib height is about 1/16th of an inch. Other rib heights, widths and spacings may also be appropriate for other applications.

During the construction of a seal the cavities 122 and 131 are filed with the water-activated coagulant 136. It has been found that the polyacrylamide granules are particularly useful in this configuration. As was true with the seal in FIG. 2, is completed by installing a conventional valve stem 26 and valve 27 in one end wall such as end wall 120 by vulcanizing and other techniques well known in the art. In addition, a single aperture 137 can be formed through the barrier 130 to provide a water passage between the cavity 122 and the cavity 131. As water enters the cavities 122 and 131 through the valve stem 25 forces the elongated sides 117 and 118 radially outward about a pipe, such as pipe 12 shown in FIG. 1. Moreover, the water reacts with the granules 136 in the cavity 122 and passes through the aperture 137 to react with the granules 136 in the cavity 131. The polyacrylamide crystals 136 absorb the water and increase their volumes dramatically. Thus, the liquid transforms into a viscous gel that fills the cavities and stabilizes the seal.

Figure 9:
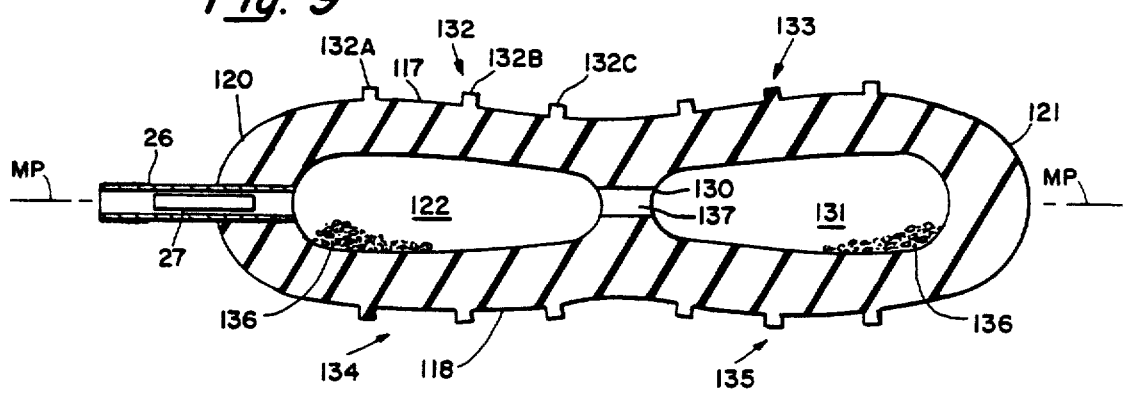
FIG. 9 is a cross-sectional view along lines 99 in FIG. 8.

The construction of the seal 116 with thickened end walls 120 and 121 and the central membrane or barrier 130 causes the elongated sides 117 and 118 to expand and produce bulges centrally located about each of the cavities 122 and 131 as shown in FIG. 9. This natural tendency for the seal to deform more readily at the center of the cavities 122 and 131, rather than at the ends 120 and 121 and the barrier 130, has the advantage of producing a greater sealing force between the seal 116 and the adjacent concrete surfaces along each of the sets of sealing ribs 132 through 135.

The greater sealing force applied to the sealing ribs 132 through 135 and the specific construction of each set of ribs with the spaced rectangular ribbed surfaces is particularly beneficial when the seal is applied to rough concrete surfaces. This double sealing structure and the spaced rib structure produce two results. First, the sealing effect of the ribs sets 132 through 135 against the concrete surface and into interstices within the concrete itself is improved. It is less likely in such situations that liquid can seep under a sealing rib to a cavity between the ribs and work its way through the entire sealing structure. Second, the double expansion of the seal improves the stable relationship between the pipe and the manhole. The enlarged configuration tends to produce increased friction and restrains translational motion of the pipe with respect to the abutting and supporting concrete surfaces.

Figure 10:
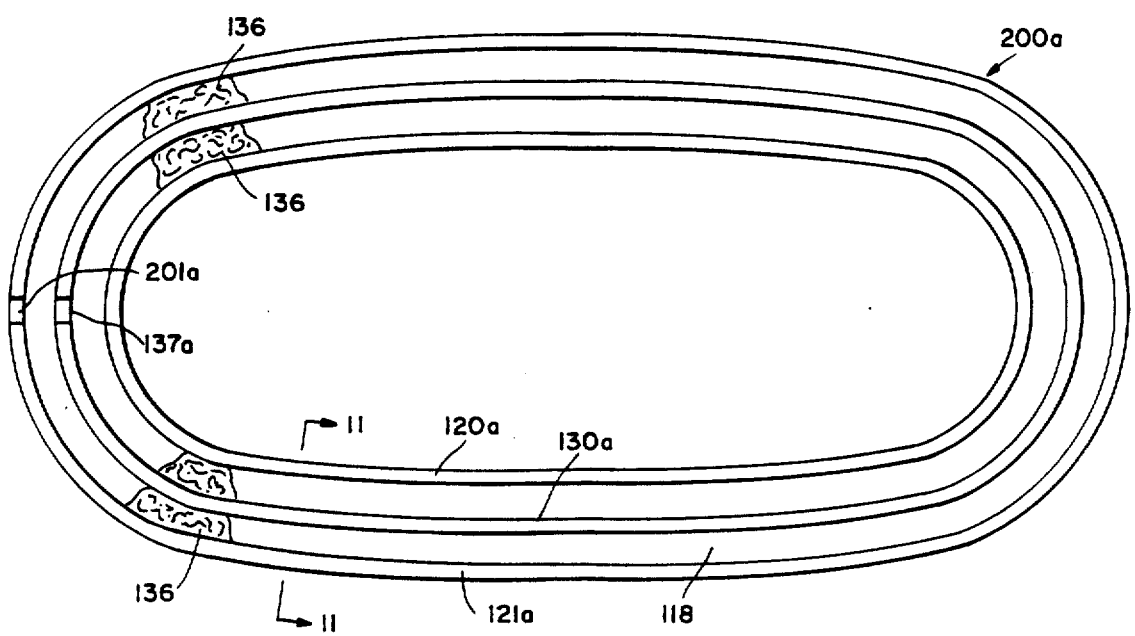
FIG. 10 is a view of a component used in one manufacturing process for the seal in FIGS. 8 and 9.

As previously described, it is possible to produce the seals shown in FIGS. 1 through 9 by extruding long lengths of material with the desired cross-section and then cutting a length of the extrusion to a desired length and joining the ends to complete the seal. In accordance with another process, the seal comprises two molded components that are joined about the circumference of the seal. As shown in FIG. 10, one half of a complete seal is molded as a component 200a corresponding to one half the seal formed by breaking the seal in FIG. 10 along a midplane represented by line MP. The overall circumference of the mold, and hence of the seal component 200a, corresponds to a predetermined pipe diameter. Thus, there is one mold for each seal or pipe size. Each mold produces substantially similar components, with two components 200a and 200b being placed in a counterfacing relationship to form the seal.

Figure 11:
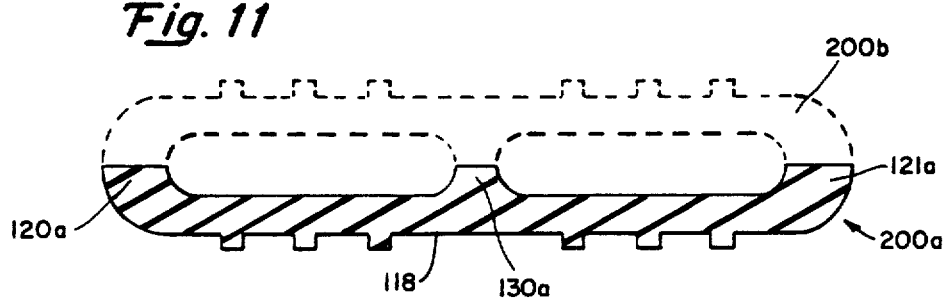
FIG. 11 is a partial cross-sectional view along lines 11—11 of FIG. 10.

Referring to FIGS. 10 and 11 and using the reference numerals from the embodiment shown in FIGS. 8 and 9, the mold produces a seal component 200a with an elongated wall section 118 having ribs 134 and 135, half the end walls 120 and 121, represented by sections 120a and 121a, and half the central barrier 130, represented by barrier 130a. The component will include a partial aperture 201a that receives the valve stem 26 and valve 27, such as shown in FIG. 4, a partial aperture 137a that forms the transfer aperture 137 through the barrier 130.

Construction of a seal using the molded components includes the following steps. A first component 200a is injected molded and a second component 200b is injected molded. The valve 27 is molded into the aperture 201a and the granular material 136 is deposited in the recesses between the end wall sections 120a and 121a and the barrier 130a. One half, i.e., the component 200b shown in phantom in FIG. 11, is placed over the component 200a. Sealing is accomplished by vulcanizing or other joining process and a pre-filled seal of appropriate length is produced.

Thus, in accordance with the objects of this invention, the construction and installation of a pipe-to-supporting structure seal are simplified. No special filler materials need to be taken to the site. The installation equipment is simple and can be used many times. Moreover, the porous nature of the gel, formed in the cavity, enables the seal to be repaired expeditiously.

This foregoing description has disclosed certain embodiments of this invention. It will be apparent, however, that many modifications, such as using different coagulants or substituting rounded ribs for the rectangular ribs in FIGS. 8 and 9, can be made to these specific embodiments without departing from this invention. Therefore, it is the intent of the appended claims to cover all such variations and modifications as come within the true spirit and scope of this invention.

I claim:

1. A seal for sealably and flexibly joining together a pipe member and an enclosed body formed with a porthole that is defined by a circular edge, said seal comprising:
   a double-walled elastic sleeve for circumscribing the periphery of the pipe member to form a continuous cavity within said sleeve,
   dry, liquid-activated coagulation means disposed within said cavity for forming, with the addition of a low-viscosity, substantially incompressible liquid, an amorphous, cellular, gelatinous mass that fills said cavity to support said sleeve in an expanded, sealing configuration thereby to permit limited motion between the pipe member and the supporting structure while maintaining the seal therebetween, and
   means for directing the liquid into said sleeve under pressure thereby to expand the walls of said sleeve into sealing relationships with the pipe and with the supporting structure adjacent the porthole.

2. A seal as recited in claim 1 wherein said liquid directing means comprises a valve bonded to said sleeve for admitting liquid under pressure from an input of said valve to said cavity.

3. A seal as recited in claim 2 wherein said liquid directing means additionally comprises a distribution conduit disposed in said cavity and connected to the output of said valve thereby to facilitate the distribution of the liquid in said cavity and through said coagulant.

4. A seal as recited in claim 1 wherein said sleeve is formed from an extrusion of indeterminate length, a sleeve for a particular application including a finite length of said extrusion and a filling of said coagulant means, the ends of said section being joined thereby to form a closed structure with an annular cavity.

5. A seal as recited in claim 1 or 4 wherein said sleeve has an oval cross section and includes grooved surfaces formed in each of said elongated sides to seal against the pipe member and enclosure body.

6. A seal as recited in claim 5 wherein said grooved surfaces have a triangular cross sections.

7. A seal as recited in claim 5 additionally comprising an extruded rib with grooves formed on one side thereof that mate with said grooved surfaces or one side of said sleeve.

8. A seal as recited in claim 1 wherein said liquid is water.

9. A seal as recited in claim 1 wherein said liquid comprises a mixture of water and an anti-freeze solution.

10. A seal as recited in claim 1 or 4 wherein said elastic sleeve comprises a plurality of continuous cavities thereon, a separating membrane between said adjacent cavities and an aperture through said membrane for directing said liquid to said cavities.

11. A seal as recited in claim 10 wherein said sleeve has an elongated cross section defining said sealing walls for sealing against the pipe and manhole and additionally comprises end walls connecting said sealing walls, said walls being thicker than said sealing walls.

12. A seal as recited in claim 10 wherein said plurality of cavities comprises two cavities.

13. A seal as recited in claim 10 wherein said seal additionally comprises a plurality of sealing rib sets extending longitudinally of said sleeve and being centrally disposed of each of said cavities on each of said exterior surfaces of said sleeve, each of said rib sets including a plurality of spaced, discrete sealing ribs.

14. A seal as recited in claim 13 wherein said liquid-activated coagulation means comprises a polyacrylamide material in granular form.

15. A seal as recited in claim 13 wherein each of said sealing rib sets comprises three sealing ribs.

16. A seal as recited in claim 13 wherein said liquid directing means comprises a valve stem bonded to said sleeve and a valve in said valve stem for admitting liquid under pressure from an input to said valve stem to said cavity.

17. A seal as recited in claim 16 wherein said liquid-activated coagulation means comprises a polyacrylamide material in granular form and said liquid includes water.

18. A system for yieldably and flexibly connecting a section of a pipe into a manhole riser for producing a seal between the pipe and a supporting structure around a porthole formed to receive the pipe, said system comprising:

A. a seal for disposition in the porthole between the supporting structure and the pipe, said seal comprising:
      (1) a double-walled, elastic sleeve for circumscribing the periphery of the pipe and defining a continuous cavity therein,
      (2) means for directing liquid into said cavity under pressure thereby to expand the wells of said sleeve into sealing relationships with the pipe and with the supporting structure adjacent the porthole, and
      (3) dry, liquid-activated coagulation means disposed within said cavity for forming, with said liquid, an amorphous, cellular, gelatinous mass that fills said cavity and supports said sleeve in its expanded, sealing configuration thereby to permit limited motion between the pipe and the supporting structure while maintaining the seal therebetween, and B. liquid supply means for supplying the liquid under pressure to said directing means.

19. A system as recited in claim 18 wherein said liquid supply means comprises:

a pressure pump for producing a stream of liquid under pressure, check valve means connected to the output of said pump means, and bleeder means connecting said check valve means to said liquid directing means on said seal means, said liquid supply means providing liquid under pressure and said bleeder means enabling the release of entrained air from said seal.

20. A system as recited in claim 19 wherein said liquid is water.

21. A system as recited in claim 19 wherein said liquid directing means comprises a valve stem bonded to said sleeve and a valve in said valve stem for admitting liquid under pressure from an input of said valve stem to said cavity.

22. A system as recited in claim 19 wherein said sleeve is formed from an extrusion of indeterminate length, a sleeve for a particular application including a finite length of said extrusion and a filling of said coagulant means, the ends of said section being joined thereby to form a closed structure with an annular cavity.

23. A system as recited in claim 19 wherein said sleeve is formed from first and second complementary, counterfacing annular rings with a diameter corresponding to the first diameter of the pipe, each said ring having first and second partial apertures, one partial aperture receiving a valve and the other forming a transfer passage for liquid from one cavity to another.

24. A method for producing a seal between a pipe and a supporting structure comprising the steps of:

A. forming a porthole in the supporting structure that is larger than the pipe,

B. forming a continuous sleeve means around the pipe, the sleeve means including a sleeve having a dry coagulant material disposed therein for partially filling the cavity and constituting a closed structure and a valve means formed to communicate with the interior portions of the sleeve, C. positioning the pipe and sleeve in the porthole, D. supplying liquid under pressure for expanding the sleeve into sealing relationship with the pipe and the supporting structure, E. venting any entrained air in the liquid and repressurizing the liquid, the liquid and coagulant in the sleeve forming an amorphous, cellular, gelatinous mass throughout the volume of the sleeve.

25. A method as recited in claim 24 wherein formation of the sleeve around the pipe includes the step of cutting a fixed length of the sleeve material and rubber heat sealing the ends of the length together thereby to form the closed loop and inserting the valve in the fixed length, said valve being positioned at the top of the pipe.

26. A method as recited in claim 24 wherein said supplying of liquid comprises the step of pumping water under pressure through the valve means in the sleeve.

27. A method as recited in claim 24 wherein said supplying of liquid comprises the steps of mixing a solution of water and antifreeze and pumping the solution under pressure through the valve means in the sleeve.

* * * * *